United States Patent [19]

Eyer et al.

[11] Patent Number: 5,594,794
[45] Date of Patent: Jan. 14, 1997

[54] METHOD AND APPARATUS FOR FREE PREVIEWS OF COMMUNICATION NETWORK SERVICES

[75] Inventors: Mark Eyer, San Diego; Allen Shumate, Poway; Paul Moroney, Olivenhain, all of Calif.

[73] Assignee: General Instrument Corporation of Delaware, Chicago, Ill.

[21] Appl. No.: 324,591

[22] Filed: Oct. 18, 1994

[51] Int. Cl.⁶ .................................................. H04L 9/00
[52] U.S. Cl. ............................................. 380/20; 380/21
[58] Field of Search ......................................... 380/20, 21

[56] References Cited

U.S. PATENT DOCUMENTS

| | | | |
|---|---|---|---|
| 4,613,901 | 9/1986 | Gilhousen et al. | 380/20 |
| 4,739,510 | 4/1988 | Jeffers et al. | 380/20 |
| 4,864,615 | 9/1989 | Bennett et al. | 380/20 |
| 5,091,938 | 2/1992 | Thompson et al. | 380/21 |
| 5,311,325 | 5/1994 | Edwards et al. | 380/20 |
| 5,323,462 | 6/1994 | Farmer | 380/20 |

*Primary Examiner*—Salvatore Cangialosi
*Attorney, Agent, or Firm*—Barry R. Lipsitz; Ralph F. Hoppin

[57] ABSTRACT

Limited duration previews of program offerings available for purchase via a communication network are provided in a cryptographically secure manner at virtually any time during the service. The invention has particular applicability to the provision of video services on a pay-per-view basis. Such a video service is provided during a program epoch. A fixed period is defined during the program epoch when portions of the video service are available for viewing on a preview basis. A consumer is allowed to preview, without purchase, portions of the video service at any time during the fixed period for up to a maximum preview duration that is shorter than the fixed period. The consumer can then purchase the video service for viewing during the program epoch after previewing portions thereof. A plurality of records is maintained to service different previewable programs concurrently.

29 Claims, 5 Drawing Sheets

METHOD AND APPARATUS FOR FREE PREVIEWS OF COMMUNICATION NETWORK SERVICES

BACKGROUND OF THE INVENTION

The present invention relates to communications networks such as cable television, satellite television and computer networks over which services are available for a fee, and more particularly to a method and apparatus for providing free previews of individual program offerings (e.g., a movie) prior to purchasing that offering.

Cable and satellite television networks where video services are available for a fee are well known. Also well known are computer network services such as CompuServe, Prodigy, America Online, Dialog Information Service, and others where databases, banking and shopping services can be accessed and e-mail and the like can be communicated, all for a fee. In the past, some communication networks have provided services on a free trial basis. For example, pay per view television movies, in which a viewer can order a movie for viewing upon payment of a fee, have sometimes enabled viewers to watch the first five minutes or so of the movie on a preview basis before purchase is required. Such previews were limited to a predefined time period at the beginning of the movie. Free previews were not available at any other time during the broadcast of the movie.

The provision of a limited free preview at any time during the broadcast of a service (such as a movie) would be desirable from a consumer's standpoint. For video services, a viewer would not be constrained to having a preview only at the beginning of the program, which may not be a convenient time for the viewer. However, the provision of a limited duration free preview at any time during the availability of a service is fraught with danger from the standpoint of the service provider. In particular, opening up a service to free previews at any time may make it possible for an unscrupulous viewer or "pirate" to defeat the security of the signal and obtain the entire service without charge.

It would be advantageous to provide a method and apparatus for allowing a limited duration free preview at virtually any time during the provision of a service. It would be further advantageous to provide such a method and apparatus that are not easily taken advantage of by unscrupulous customers or pirates. Such a method and apparatus should maintain signal security while providing the flexibility of an "anytime free preview" (AFP). It would also be advantageous to provide such a method and apparatus that enable a viewer to switch back and forth between one or more AFPs (each associated with a different service) and conventional programming. Each AFP would be limited to its own particular maximum AFP duration. Such a system must remain secure at all times and prevent a viewer from obtaining free previews for more than the maximum duration assigned to the particular service. The present invention provides a method and apparatus having the aforementioned and other advantages.

SUMMARY OF THE INVENTION

A method in accordance with the present invention provides video services to consumers via an information network. A video service is provided on a pay-per-view basis during a program epoch. A fixed period is defined during the program epoch when portions of the video service are available for viewing on a preview basis. A consumer is allowed to preview, without purchase, portions of the video service at any time during the fixed period for up to a maximum preview duration that is shorter than the fixed period. The maximum preview duration is preferably enforced in a cryptographically secure manner. In particular, a record can be maintained in a cryptographically secure manner to indicate the amount of unused preview time remaining for the consumer to view the video service during the fixed period. The fixed period during which portions of the video service are available for previewing, as well as data identifying whether a preview is available for a particular service, are also preferably maintained in a cryptographically secure manner.

In a preferred embodiment, the method of the invention enables a consumer to purchase the video service for viewing during the program epoch after previewing portions of the service. Also in the preferred embodiment, the program epoch is divided into a plurality of working key epochs (WKE's). A count of the WKE's is cryptographically authenticated. The authenticated count is used to implement (i.e., define and keep track of) said maximum preview duration.

The method can further comprise the steps of maintaining a record of services which the consumer has previewed during prior program epochs. The consumer is then prohibited from previewing a service during a current program epoch if the consumer has previewed any part of that service during a prior program epoch. This prevents a consumer from recording successive free previews in order to accumulate a full movie or other program for viewing. The record of services which the consumer has previewed during prior program epochs can be maintained in a cryptographically secure manner.

In an illustrated embodiment, up to N active records of previewable services can be maintained at a time. Each record comprises either a purchase record representing a previewable service that has been purchased by the consumer or a preview record representing a service that the consumer has selected for preview. The expiration of an active previewable service record is prevented until the program epoch for the service represented by that record is over. The expiration time is controlled by an expiration timer. Alternatively, the expiration can be prevented by establishing a fixed minimum time period (e.g., several hours) for each record. The fixed minimum record duration is longer than the longest service that has a free preview available.

The method of the present invention can also include the step of preventing the erasure of any preview record until the program epoch for the service represented thereby is over. In the illustrated embodiment, a preview record is converted to a purchase record upon purchase by the consumer of the service represented by the preview record. At the time of conversion, the purchase record is rendered irrevocable. In such an embodiment, the erasure of any preview record is prevented until the program epoch for the service represented thereby is over, except that a preview record can be erased by conversion to an irrevocable purchase record.

Whenever all N records of previewable services are active, additional previews are denied to the consumer. However, a consumer can still purchase a service, in which event one of the preview records will be overwritten with a purchase record. Preferably, the next to expire preview record will be the one that is overwritten. When a preview record is open, the consumer can be informed of how much unused preview time remains for the corresponding video service.

Apparatus in accordance with the present invention provides previews of services available for purchase via a communication network. First means process data received from the communication network. The data (i) identifies a service available for purchase, (ii) identifies a period of time (epoch) over which the service is provided, (iii) indicates whether a preview is available for the service, and (iv) provides information necessary to generate keys for enabling an authorized consumer to receive the service or a preview thereof. Second means, responsive to the first means when a preview is available for the service, are provided for keeping track of a fixed period during the epoch when previewing is permitted. A user interface cooperates with the first and second means for enabling a consumer to preview portions of the service at any time during the fixed period for up to a maximum preview duration that is shorter than the fixed period. The user interface also enables a consumer to purchase the service. Means are responsive to the first means for decrypting the service during a preview and after a purchase thereof.

The apparatus in accordance with the invention can further comprise means for enforcing the maximum preview duration in a cryptographically secure manner. The apparatus can maintain a record in a cryptographically secure manner to indicate the amount of unused preview time remaining for the consumer to view the service during the fixed period.

Means can be provided for maintaining up to N active records of previewable services at a time. Each record comprises either a purchase record representing a previewable service that has been purchased by the consumer or a preview record representing a service that the consumer has selected for preview. Means are provided for preventing the expiration of an active previewable service record until the program epoch for the service represented by that record is over. Means can further be provided for preventing the erasure of any preview record until the program epoch for the service represented thereby is over. In an illustrated embodiment, means are provided for converting a preview record to a purchase record upon purchase by the consumer of the service represented by the preview record. The purchase record provided by the converting means is rendered irrevocable. Except for possible conversion to an irrevocable purchase record, the erasure of any preview record is prevented until the program epoch for the service represented thereby is over.

The apparatus of the invention can further comprise means for denying any previews or previewable services to the consumer whenever all N previewable service records are active. Means can also be provided for informing the consumer of how much unused preview time remains for each service.

In an illustrated embodiment, the epoch over which the service is provided is divided into a plurality of working key epochs. A cryptographically authenticated count of the working key epochs is used to implement said maximum preview duration. Means are provided for further cryptographically authenticating at least the portion of the data that identifies whether a preview is available for said service, and the fixed period during which previewing is permitted.

DETAILED DESCRIPTION OF THE INVENTION

Figure 1:
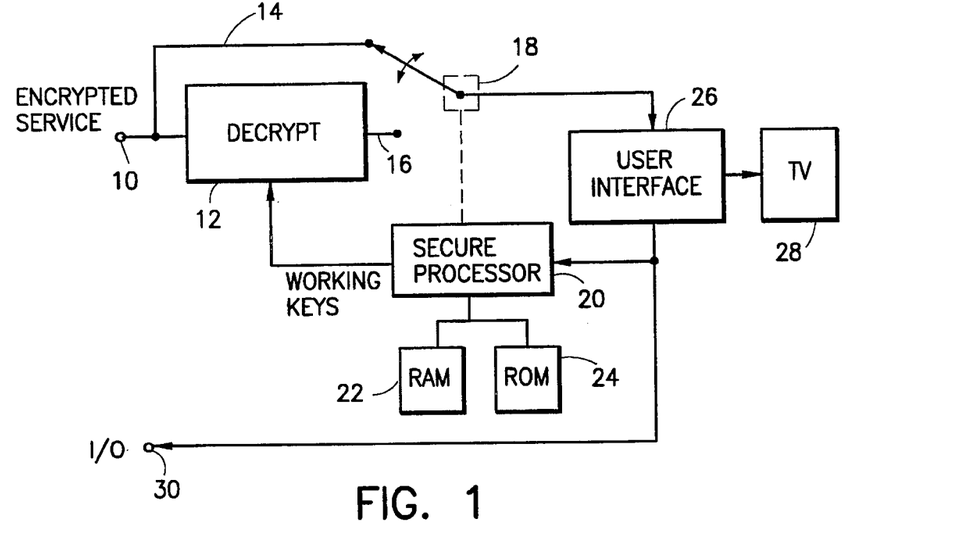
FIG. 1 is a block diagram of apparatus in accordance with the present invention.

FIG. 1 illustrates, in block diagram form, the decryption portion of a digital satellite or cable television receiver or the like. An encrypted service (e.g., a premium television service) is input to terminal 10. By the time the bitstream comprising the service is input to terminal 10, it has already been received and demodulated from the communication channel over which it is transmitted, using conventional techniques. The encrypted service is decrypted by a decryption processor 12 in order to provide a clear signal at output 16 of the decryption processor.

The decryption processor can utilize a conventional decryption scheme, such as that disclosed in Gilhousen, et al. U.S. Pat. No. 4,613,901 entitled "Signal Encryption and Distribution System for Controlling Scrambling and Selective Remote Descrambling of Television Signals," or Bennett et al. U.S. Pat. No. 4,864,615 entitled "Reproduction of Secure Keys By Using Distributed Key Generation Data," both incorporated herein by reference. The decryption processor requires working keys (WK) in order to decrypt the signals input thereto via terminal 10. The working keys are generated by a secure processor 20 in response to control signals received via input/output (I/O) terminal 30. Firmware for the secure processor is stored in read only memory (ROM) 24. The secure processor is also provided with random access memory (RAM) 22 in a conventional manner. A secure portion of RAM 22 holds unit specific keys and/or seeds for use in decryption of a monthly key, as discussed in greater detail in connection with FIG. 2.

A user interface 26 enables a viewer to select services for viewing on a television (TV) 28. If a user is authorized to receive the selected service by subscription or individual purchase (e.g., pay per view), secure processor 20 will actuate switch 18 to couple the decrypted output 16 from decryption processor 12 to the TV 28 via user interface 26. Otherwise, the user interface and TV will only receive the encrypted signal via line 14 and switch 18.

Figure 2:
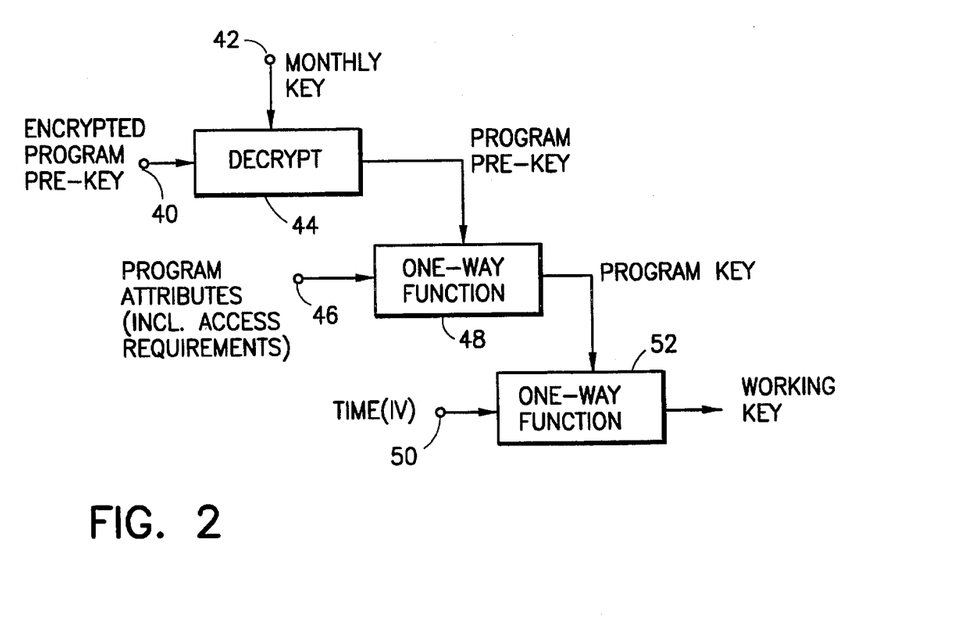
FIG. 2 is a block diagram illustrating the decryption hierarchy used in accordance with the present invention.

A typical key hierarchy is illustrated in FIG. 2. An encrypted program pre-key is input via terminal 40 to a decryption function 44 which also receives a monthly key via terminal 42. The program pre-key is unique to each encrypted program offering (e.g., television program) that is available for decryption. The monthly key is changed on a periodic basis, e.g., once each month. The decryption function 44 decrypts the encrypted program pre-key to provide a program pre-key that is used as one input to a one-way function 48. The other input to one way function 48 comprises various program attributes, including access requirements, for the corresponding program. The access requirements must be met in order to obtain authorization to view the program. The program attributes are input via terminal 46, and the one way function processes the program pre-key and program attributes to provide a program key. The program key output from one way function 48 is used as one input to another one way function 52 that also receives, via terminal 50, an initialization vector (IV) representative of time. The processing of the initialization vector and program key by one way function 52 generates the working keys required by decryption processor 12 (FIG. 1) to decrypt the service selected by an authorized user. A further description of the generation of the various keys, including working keys (provided in a "keystream"), can be found in the aforementioned Bennett, et al. patent.

Figure 3:
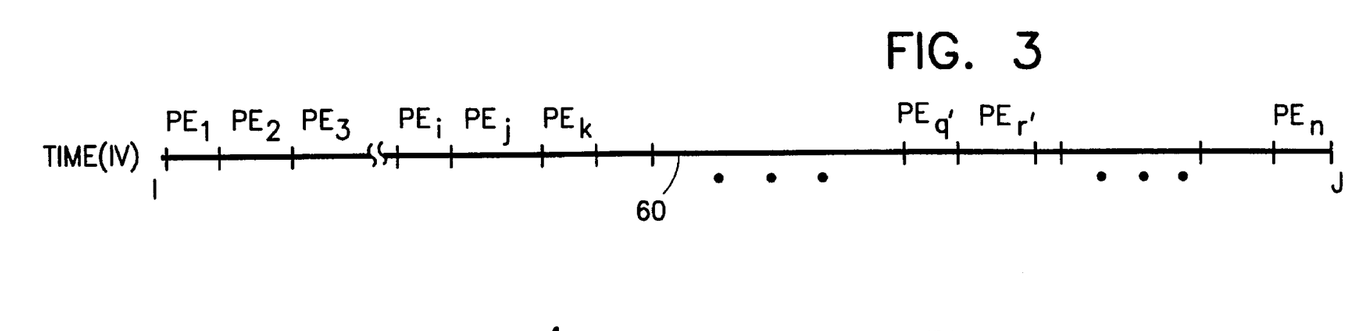
FIG. 3 is a time line, illustrating different program epochs that occur over time.

FIG. 3 is a diagrammatic illustration of the initialization vector that is input to terminal 50 of one way function 52. The initialization vector 60 commences at time=I and runs until time=J, which can be, for example, several weeks, at which time the count resets. During the time represented by the vector 60, a plurality of program epochs ($PE_1$ through $PE_n$) occur. Each program epoch can be of a different length, and is associated with one program offering.

Figure 4:
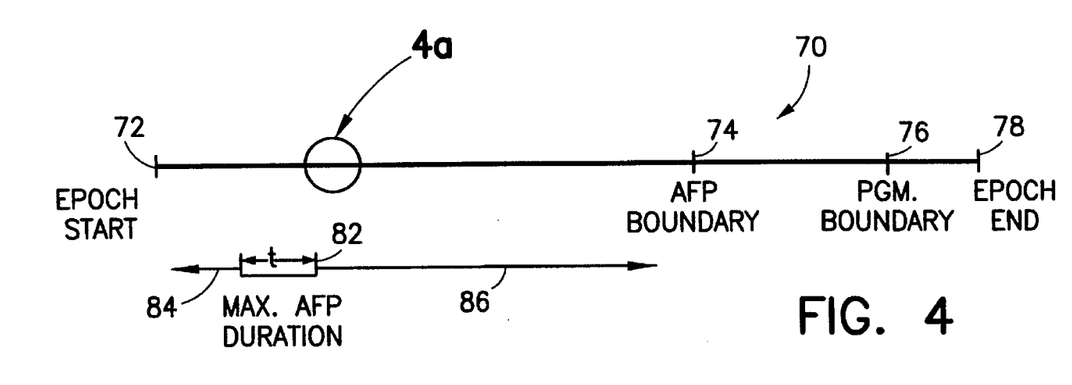
FIGS. 4 and 4a provide a diagrammatic illustration of one program epoch, illustrating various boundaries contained therein and a sample of the working key epochs (WKE's) that occur during the program epoch.

FIG. 4 is a diagrammatic illustration of one program epoch, generally designated 70. The epoch starts at time 72 and ends at time 78. Prior to the end of the epoch, there is an AFP boundary 74 and a program boundary 76. The time between the start of the epoch 72 and the AFP boundary 74 is a fixed period during the program epoch when portions of the program are available for viewing on a preview basis. During this fixed period, the program can be previewed for a maximum AFP duration 82. As indicated by arrows 84 and 86 in FIG. 4, the AFP can be viewed at any time from the start of the epoch to the AFP boundary, but only for up to the maximum AFP duration "t" provided. In order to permit a viewer to view some part of the allowed free preview time, tune away, and then return to watch the remaining part, the maximum AFP duration 82 is maintained as a count of working keys which is decremented as the allowable AFP time is used up.

Figure 4A:
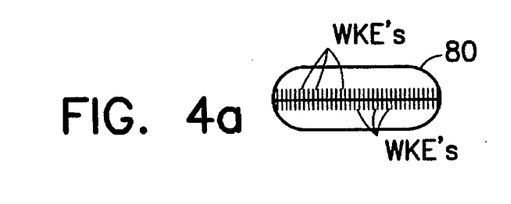

During a program epoch, working keys are generated for authorized subscribers that have purchased or, during a preview period, requested a preview of the program. The program epoch is divided into a plurality of working key epochs (WKE's) 80, as illustrated in FIG. 4a. For example, the working key epochs may occur at a rate of eight WKE's per second, or at any other interval that is desirable for a given implementation of the system. The WKE's can provide a convenient means for maintaining the integrity of the AFP boundary 74. In a preferred embodiment, the AFP boundary is the value of the WKE representing the boundary beyond which an anytime free preview is not allowed. This parameter is authenticated by including it in the program key generators. The computation and maintenance of the AFP boundary is discussed in greater detail below, in connection with FIGS. 6 and 7.

The program boundary 76 is the point at which the program provided during the epoch is expected to end. The end of the epoch 78 may extend beyond the program boundary 76 to accommodate the possibility of a program running over its original expected length. For example, if a program is interrupted by a news bulletin, the program ending time may be extended. Similarly, since it is impossible to accurately predict the end of a sports event, it may be necessary to extend the program boundary within the program epoch to accommodate a game that runs into overtime.

In accordance with the present invention, no free previews are permitted after the AFP boundary 74. Thus, during the portion of a program that runs between the AFP boundary 74 and the epoch end 78, free previews can not be obtained. The reason for providing the AFP boundary is to defend against certain attacks by a pirate who attempts to use the AFP feature in order to obtain a program or service without proper payment. In particular, a pirate may attempt to change the time at which a program epoch ends in order to obtain free services. However, this will not help him steal successive anytime free previews, because the AFP boundary is an authenticated value beyond which free previews will not be available. Further, as explained in greater detail below, the present invention establishes "records" of previews and purchased programs, which are not allowed to expire prematurely in a way that would be helpful to a pirate.

In order to prevent the theft of services by taking advantage of the anytime free preview feature, the secure processor 20 (FIG. 1) of the present invention securely regulates the duration of a program segment that may be viewed without purchase. In order to accomplish this, the anytime free preview duration is maintained in units of working key epochs. The secure processor 20 counts the number of free working keys generated. When the count reaches a limit established by the maximum AFP duration 82 (FIG. 4), the authorization state is changed from "can buy or obtain a free preview" to "can buy only." The AFP duration is one of the program attributes that is included in the generation of the program key. Thus, it can not be altered without altering the program key itself, which would prevent the correct decryption of the program.

As mentioned above, the system of the present invention establishes a record for each program previewed or purchased. Once the user chooses to view an AFP, a "preview record" is created in the secure processor 20 to define the number of free working keys allowed, and to keep a real time counter to cause the record to expire when the event or program is over. The timer must continue to run whether or not the receiver is synchronized to a scrambled or encrypted waveform, so that records expire at the proper time. If an AFP record were to expire early, a second free viewing period could be taken. If the record expires late, no harm is done but the number of new free preview offerings is reduced during the existence of the record beyond the end of the program.

In accordance with the present invention, up to N multi-function records are maintained. Each record is either a "preview record" representing an anytime free preview selected by the user, a "purchase record" representing a program that the user has bought or an inactive (null) record. Also, in accordance with the present invention, it is not possible for a preview record for a given event to be erased before the event is over, except by a legitimate purchase of the event or another purchasable service, in which case the record is overwritten to provide a purchase record. Typically, a user will request a free preview, and then decide whether or not to purchase the event based on the free preview. If the event is not purchased, the preview record is maintained until the end of the event unless another service is purchased to overwrite it. If the user decides to purchase the event, then the preview record is converted to a purchase record.

Preventing the erasure of a preview record before the event is over is an essential feature of the present invention. If preview records were merely stored in a first-in first-out queue (FIFO), older records would be lost as new records are added. A user could then cumulatively watch more than the free preview limit by scanning through and watching one second of a number of programs to flush the queue, and then return to watch another free preview of the desired program.

This opportunity is precluded by the maintenance of each preview record for the entire event once the preview record is established.

Also in accordance with the invention, program purchases take precedence over free preview offerings. In a case where all N available preview/purchase records are active, and at least one record holds an AFP, the secure processor 20 will indicate the authorization state as "can buy." The reason for this is that even though all of the available preview/purchase records are in use, one of the active preview records can be replaced by a purchase record. Preferably, the preview record that is replaced by the purchase record will be the one that is closest to expiring.

It is also important to carefully control any opportunity for a user to erase a preview record, since the ability to erase such a record provides an opportunity for abuse. For example, a program that is "purchased" may have been created by a pirate in his own interest. Therefore, in the case where a program purchase (i.e., a purchase record) overwrites a preview record, the present invention provides various defenses. First, a purchase which overwrites a preview record involves a secure transfer of debit, in which the debit total of the user's decoder is increased by the program cost. The number of purchases made is also counted in a secure manner. Second, the purchase record itself remains in memory until the purchased event is over. In this manner, the record is not available for another anytime free preview until the termination of the purchased event.

If a program selected for purchase is the program defined by a preview record, then that record is simply converted to a purchase record and the record remains open. After a preview record has been activated, a subsequent purchase of that program will be irrevocable. In this manner, the record for the program can not be erased. As a further precaution, the secure processor 20 establishes a minimum expiration time for a purchase record. This minimum time can be, for example, on the order of one hour, and will frustrate potential attacks by a pirate that attempts to cause an early expiration of a purchase record.

Timing of program durations and anytime free preview periods is maintained by secure processor 20. A real time program expiration counter is maintained in the secure processor for this purpose. Program durations and AFP periods can be given in units of working key epochs.

As indicated above, a set of multifunction records is maintained in the secure processor 20 to handle anytime free previews and purchased programs. A set of N such preview/program records is illustrated diagrammatically in FIG. 5. The records 90, 92, 94, 96 and 98 each include program attributes (including access requirements) for the particular program or event that the record pertains to. A preview record will also maintain a count of the time remaining (e.g., number of free working keys remaining) within the maximum AFP duration for watching a free preview. A purchase record is rendered irrevocable when established after a free preview.

The program attributes will comprise information such as the cost of the program, which access requirements (e.g., "tiers") a user must subscribe to in order to receive the program, whether an AFP is available for the program and if so how many free working keys are provided for the AFP, an initial free preview boundary if an initial free preview is available instead of or in addition to an anytime free preview, and various regional access information. Since the access requirements are authenticated by one way function 48, as shown in FIG. 2, none of these requirements can be altered without altering the program key that is used to generate the working keys for decrypting the program. If the program key used to decrypt differs from the one used to encrypt, decryption will fail. The inclusion of the maximum AFP duration (i.e., number of free WKs permitted) as an access requirement authenticates this parameter and prevents its alteration without invalidating the working keys.

Figure 5:
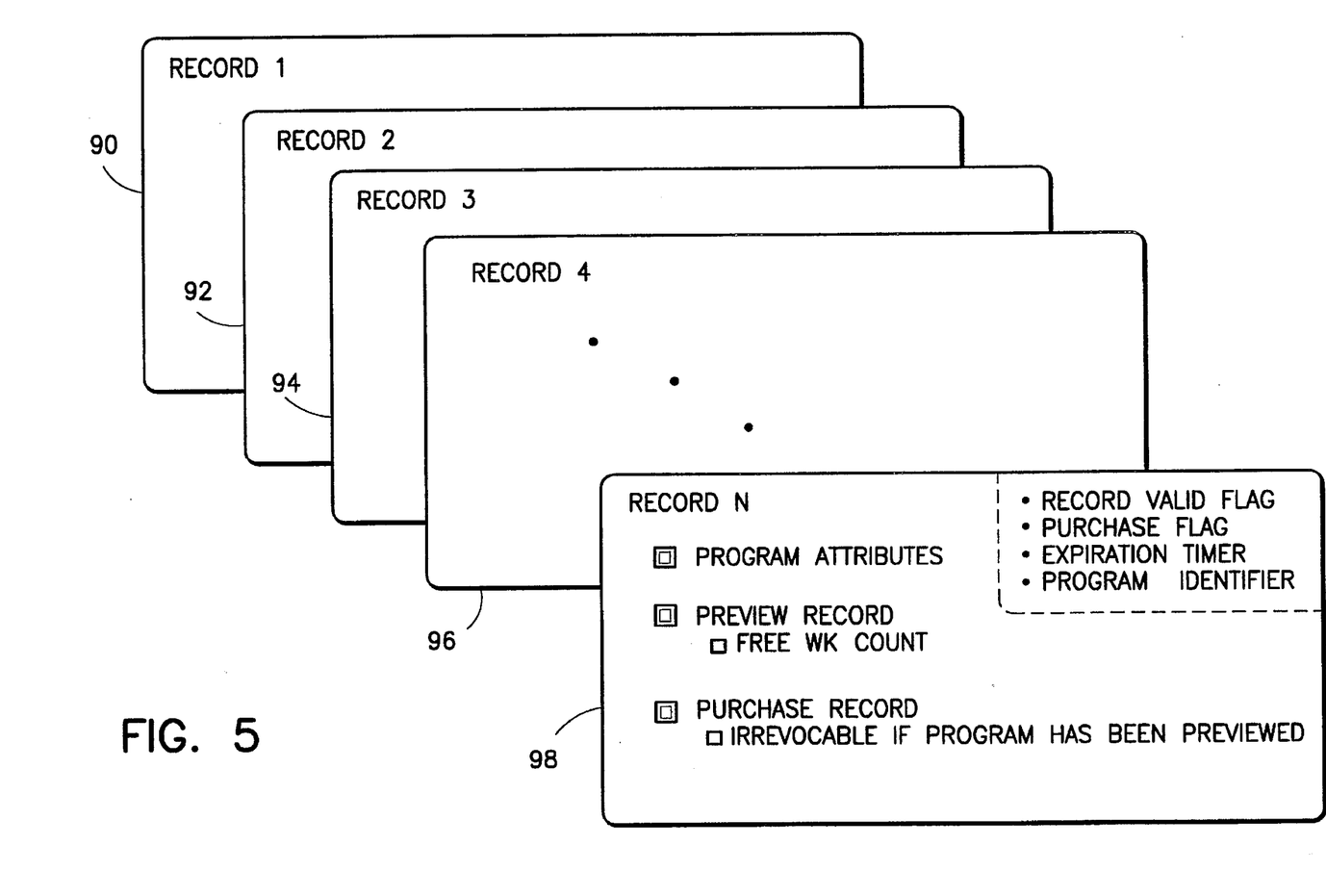
FIG. 5 is a diagrammatic illustration of various preview/program records that are maintained in accordance with the invention.

Each preview/purchase record also includes a record valid flag, a purchase flag, an expiration timer count, and a portion of the program key used as a program identifier. The record valid flag can be, for example, a one bit flag that indicates whether the record is valid or not. This flag, when set, indicates that the record contents are valid. When the flag is clear, the record is currently undefined.

The purchase flag indicates that the record describes a purchase record instead of a preview record. The working key epoch count is disregarded if the purchase flag is set. The expiration timer counts in predefined units (e.g., 2.56 seconds) the time left in the program. Once the record is expired, the record valid flag is cleared.

The portion of the program key provided in the preview/purchase record comprises, e.g., five bytes of the clear program key and is used as a program identifier. The working key epoch count counts the number of working keys provided during the anytime free preview.

As part of the derivation of an authorization state, which is required to enable a user to view a program, the secure processor determines if a given program is viewable via an anytime free preview. If an AFP is offered for a particular program, but all of the N available preview/purchase records are in use (as indicated by their record valid flags), a free preview cannot be granted.

Although a preview record could be established each time a user tunes to a channel offering an AFP, such action is not preferred. The reason is that as a user successively tunes to different channels (an activity known as "channel surfing"), programs offering AFPs will be successively encountered and the N available records will be quickly used up. Thus, the user interface 26 (FIG. 1) will offer the user the option to view an AFP if available, will offer the user the option to buy a program being previewed, will provide the user with an indication of how much free preview time is left for the program, and will handle cases where initial free preview (an offering of a preview for a limited duration at the very beginning of a program) and anytime free preview offerings interact. In a preferred embodiment, the user interface is provided via on screen displays on the user's television 28. The generation of such on screen displays is well known in the art.

In general, an on screen display will be available when the secure processor determines that an AFP is available for an acquired program. The user interface will collect text messages defining the AFP option screen. If the user selects an AFP, the user interface reports this fact to the secure processor 20 and free access is granted for up to the maximum AFP duration. In an alternate embodiment, an AFP can be automatically granted when a sufficient time has elapsed after the user tunes to a particular service.

In order to handle possible conflicts between an initial free preview and an anytime free preview, it is preferable that several rules be enforced. First, if a program has been acquired during an initial free preview period (or during a preceding epoch), the fact that an AFP is offered shall be disregarded. If the user chooses not to purchase the program and the user encounters the same program at a later time after the initial free period is over (i.e., after tuning away from the program and then back to the program), then an AFP may be offered. Second, a program purchased during the AFP period may never be cancelled. Once a purchase is made during an AFP period, the purchase is immediate and irrevocable.

Figure 6:
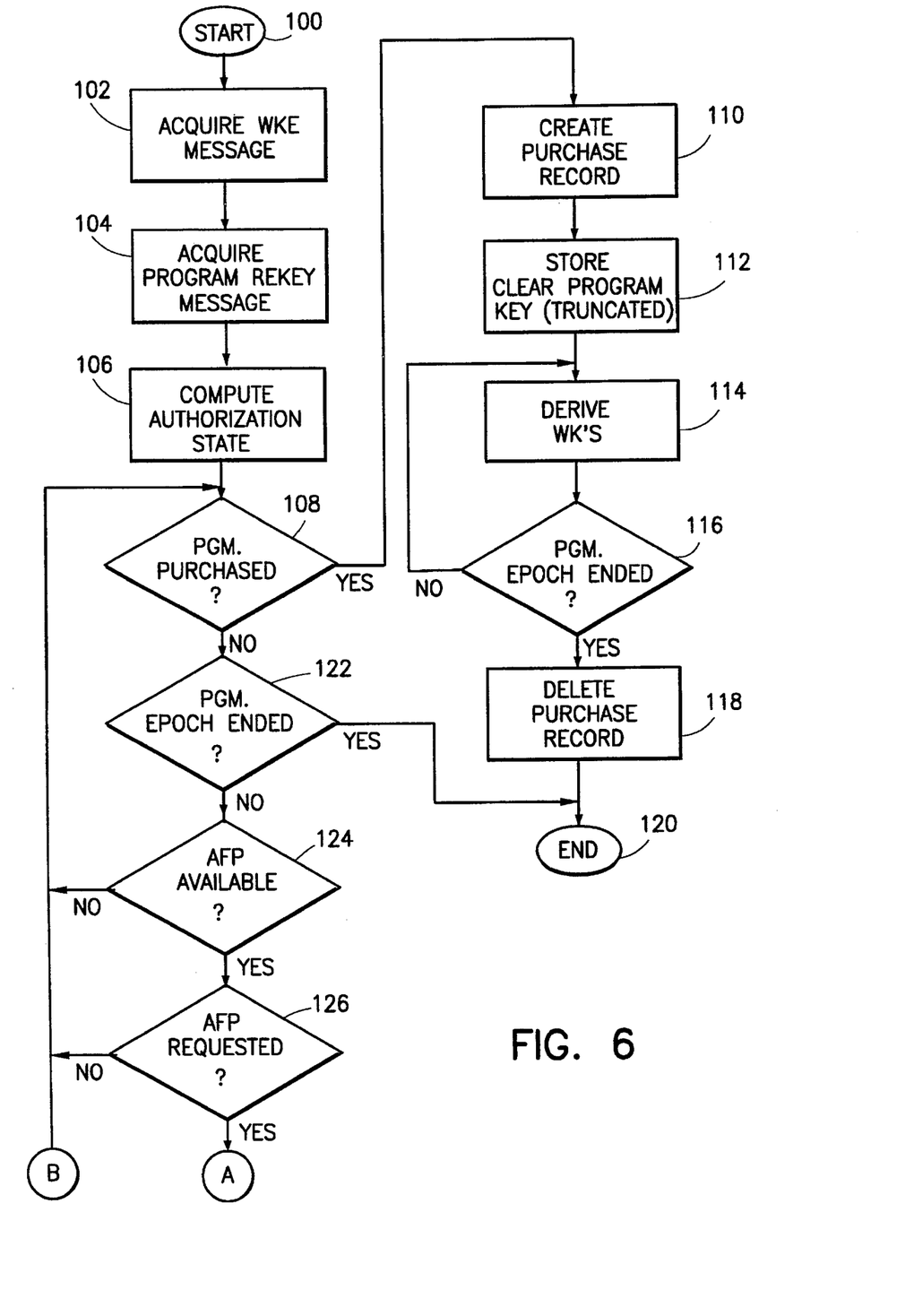
FIG. 6 is the first part of a flowchart illustrating the authorization of anytime free previews in accordance with the present invention.
Figure 7:
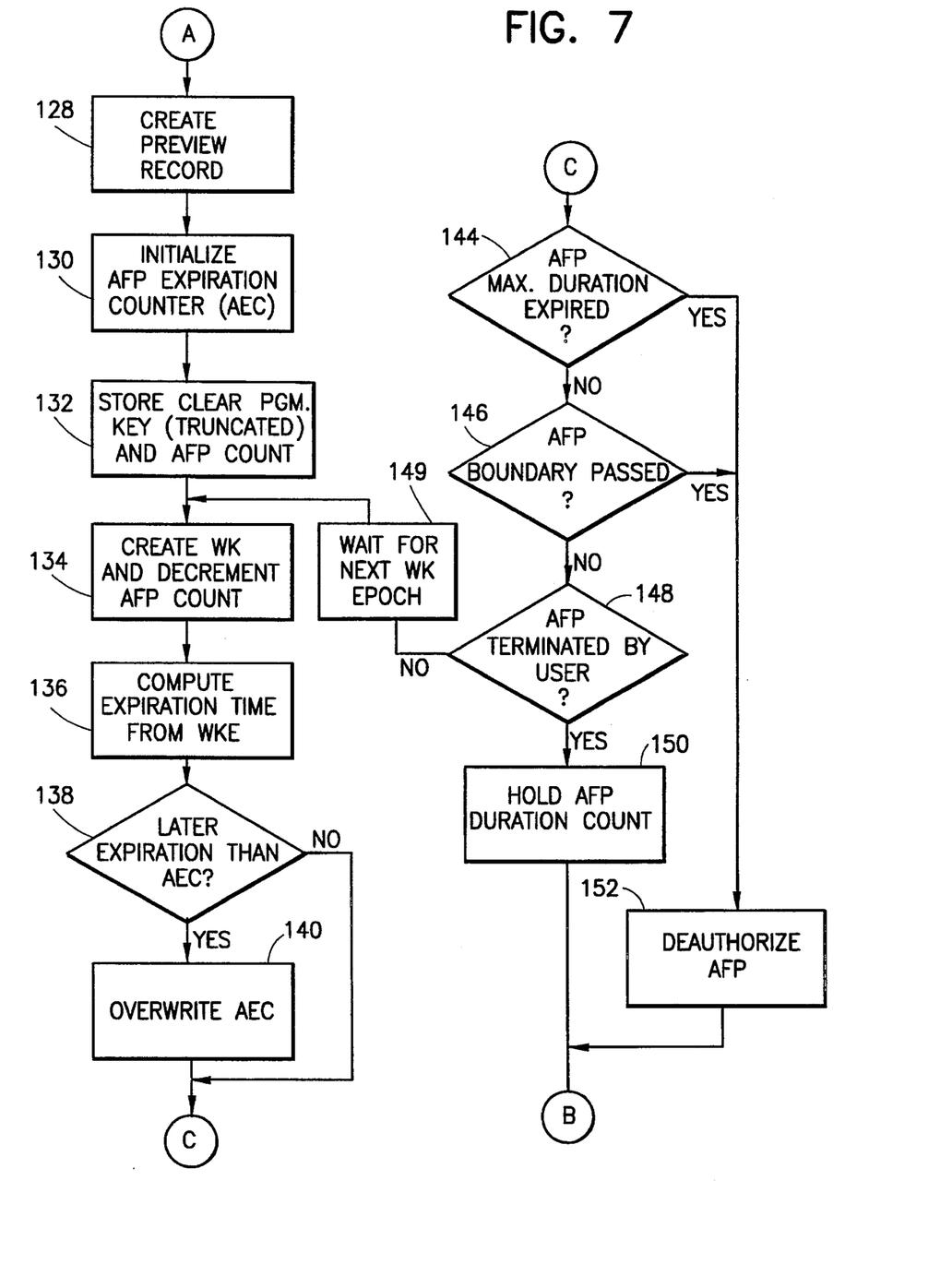
FIG. 7 is a continuation of the flowchart of FIG. 6.

FIGS. 6 and 7 illustrate, in flowchart form, the process by which anytime free previews are provided in accordance with the present invention. The routine commences at box 100, and at box 102 a working key epoch message is acquired. The WKE message identifies the WKE count within the current program epoch. At box 104, a program rekey message is acquired. As indicated in connection with the description of FIG. 2, the program pre-key is required in order to generate the program key and ultimately the working keys for authorized users. At box 106, the authorization state for the user is computed, in order to determine if the user is authorized to receive the program and any AFP provided for the program. If the user is authorized to receive the program, a determination is made at box 108 as to whether or not the user has indicated a desire to purchase the program. If so, a purchase record is created at box 110. Upon creation of the purchase record, a truncated portion of the clear program key (output from one way function 48 of FIG. 2) is stored at box 112. The clear program key is used by one way function 52 (FIG. 2) to derive the necessary working keys as indicated at box 114.

While the working keys are generated, a determination is made at box 116 as to whether the program epoch has ended. If not, the derivation of working keys continues and the process loops between boxes 114 and 116 until the program epoch ends. Upon termination of the program epoch, the purchase record is deleted as indicated at box 118. The routine then ends at box 120.

If a program has not yet been purchased by an authorized user, the routine will proceed from box 108 to box 122 where a determination is made as to whether the program epoch has ended. If so, the routine ends at box 120. If the program epoch has not ended, a determination is made at box 124 as to whether an anytime free preview is available. If not, the routine loops back to box 108.

If an AFP is available for the program (as indicated, for example, by a non-zero AFP count or by a separate "AFP available" bit) a determination is made at box 126 as to whether the user has requested to watch a free preview. If not, the routine loops back to box 108. If an AFP is requested, the routine passes to box 128 of FIG. 7. At box 128, a preview record is created. Then, at box 130 an AFP expiration counter (AEC) is initialized. At box 132, the clear program key is stored together with the AFP count. The AFP count is decremented with each working key, and provides a record of the remaining time in the maximum AFP duration (i.e., the amount of time that the viewer has left to preview the program for free).

At box 134, a working key is created and the AFP count is decremented. The program expiration time is then computed directly from the current working key epoch as indicated at box 136. In this manner, the AFP record expiration is dynamically recalculated every working key. In particular, a variable M is computed where M=(AFP boundary-current WKE count). M is then converted to real time using simple scaling, and if the result is bigger than the AEC as determined at box 138, the AEC is overwritten with the computed expiration time at box 140. This will lengthen the AEC to prevent a pirate from attempting to shorten the AEC in order to extinguish a preview record and obtain an additional AFP for the program.

After the AEC is tested and if necessary, overwritten, a determination is made, at box 144, as to whether the AFP maximum duration has expired (i.e., if the number of free working keys for the preview has been decremented to zero). If so, any further AFP for the program is deauthorized at box 152. Otherwise, a determination is made at box 146 as to whether the AFP boundary has been passed. The AFP boundary is the working key epoch count representing the boundary beyond which an anytime free preview is not allowed. As indicated above, this parameter is authenticated by including it in the program key generators.

If the AFP boundary has been passed, any further AFP for the program is deauthorized at box 152. Otherwise, a determination is made at box 148 as to whether the AFP has been terminated by the user. If not, the routine waits for the next working key epoch (box 149) and then a new working key is created at box 134. The routine then continues until either the AFP maximum duration has expired, the AFP boundary has been passed or the AFP is terminated by the user. Upon termination of the AFP by the user, the current AFP duration count is held as indicated at box 150 and nothing is done until the program is purchased, the program epoch ends, or an AFP is again requested. The AFP duration count will enable the user to reinitiate an anytime free preview during the program, and before the AFP boundary, until the maximum AFP duration has expired.

Upon holding the AFP duration count after an AFP is terminated by the user, or deauthorizing the AFP after the maximum AFP duration has expired or the AFP boundary has been passed, the routine of FIGS. 6 and 7 returns to box 108. A user can then purchase the program or service unless the program epoch has ended.

In an alternate embodiment, the maintenance of the AFP expiration counter and computation of the expiration time from the WKE (boxes 130 and 136 to 140 of FIG. 7) can be eliminated by simply setting a minimum preview record expiration time. For example, a preview record once established can be maintained for a minimum of two hours. This will secure the anytime free preview feature such that a pirate can not steal more than one AFP every two hours. If the minimum preview record expiration time is longer than the longest typical program epoch, then either this method or the method illustrated in FIG. 7 can be used to prevent the expiration of an active previewable service record until the program epoch for the service represented by that record is over.

It should now be appreciated that the present invention provides a free preview feature for services available for a fee over a communication network. A potential program purchaser is provided with the ability to view a limited number of minutes of a movie or other program for free, as an enticement to purchase the service. The present invention improves upon prior art implementations, where only the beginning portion of a movie could be viewed without charge. With the anytime free preview feature of the present invention, previewing is not limited to the beginning of a service. The duration of the free preview is variable and may be defined on a program by program basis by specifying, as a program attribute, a maximum AFP duration. The invention also enables a user to view a portion of an available free preview at one time, tune away, and then return to watch an additional portion of the free preview. The user can break the free preview into as many portions as desired, as long as the maximum AFP duration is not exceeded.

Although the invention has been described in connection with specific embodiments thereof, those skilled in the art will appreciate that numerous adaptations and modifications may be made thereto without departing from the spirit and scope of the invention as set forth in the claims.

What is claimed is:

1. A method for providing video services to consumers via an information network, comprising the steps of:
    providing a video service on a pay-per-view basis during a program epoch of a particular program of said video service;
    providing a program pre-key;
    using said program pre-key to determine a fixed period during said program epoch when portions of said video service are available for viewing on a preview basis;
    allowing a consumer to preview, without purchase, portions of said video service at any time during said fixed period for up to a maximum preview duration that is shorter than said fixed period; and
    enforcing said maximum preview duration in a cryptographically secure manner.

2. A method in accordance with claim 1 comprising the further step of:
    enabling a consumer to purchase said video service for viewing during said program epoch after previewing portions thereof.

3. A method in accordance with claim 1 wherein said program epoch is divided into a plurality of working key epochs (WKE's), comprising the further steps of:
    cryptographically authenticating a count of said WKE's; and
    using the authenticated count to implement said maximum preview duration.

4. A method in accordance with claim 1 comprising the further step of:
    maintaining a record to indicate the amount of unused preview time remaining for said consumer to view said video service during said fixed period;
    wherein said record is maintained in a cryptographically secure manner.

5. A method in accordance with claim 1 comprising the further step of:
    maintaining a record to indicate the amount of unused preview time remaining for said consumer to view said video service during said fixed period;
    wherein said record is maintained in a cryptographically secure manner.

6. A method in accordance with claim 1 comprising the further steps of:
    maintaining a record of services which said consumer has previewed during prior program epochs; and
    prohibiting said consumer from previewing a service during a current program epoch if the consumer has previewed any part of that service during a prior program epoch.

7. A method in accordance with claim 6 wherein said record of services is maintained in a cryptographically secure manner.

8. A method in accordance with claim 1 comprising the further steps of:
    maintaining up to N active records of previewable services at a time, each record comprising either a purchase record representing a previewable service that has been purchased by said consumer or a preview record representing a service that said consumer has selected for preview; and
    preventing the expiration of an active previewable service record until the program epoch for the service represented by that record is over.

9. A method in accordance with claim 8 comprising the further step of:
    preventing the erasure of any preview record until the program epoch for the service represented thereby is over.

10. A method in accordance with claim 8 comprising the further steps of:
    converting a preview record to a purchase record upon purchase by the consumer of the service represented by the preview record; and
    rendering the purchase record resulting from said converting step irrevocable.

11. A method in accordance with claim 10 comprising the further step of:
    preventing the erasure of any preview record until the program epoch for the service represented thereby is over, except by conversion to an irrevocable purchase record.

12. A method in accordance with claim 8 comprising the further step of:
    denying any additional previews to said consumer whenever all N previewable service records are active.

13. A method in accordance with claim 1 comprising the further step of:
    informing said consumer of how much unused preview time remains for said video service.

14. A method in accordance with claim 1 wherein said fixed period is enforced in a cryptographically secure manner.

15. Apparatus for providing previews of services available for purchase via a communication network, comprising:
    first means for processing data including a program pre-key received from said communication network, said data (i) identifying a service available for purchase, (ii) identifying an epoch over which said service is provided, (iii) indicating whether a preview is available for said service, and (iv) providing information necessary to generate keys for enabling an authorized consumer to receive said service or a preview thereof;
    said program pre-key being used to determine a fixed period during said epoch when previewing is permitted;
    second means responsive to said first means when a preview is available for said service for keeping track of said fixed period;
    a user interface cooperating with said first and second means for enabling a consumer to preview portions of said service at any time during said fixed period for up to a maximum preview duration that is shorter than said fixed period, said user interface also enabling a consumer to purchase said service; and
    means responsive to said first means for decrypting said service during a preview and after a purchase thereof.

16. Apparatus in accordance with claim 15 further comprising means for enforcing said maximum preview duration in a cryptographically secure manner.

17. Apparatus in accordance with claim 16 further comprising:
    means for maintaining a record in a cryptographically secure manner to indicate the amount of unused preview time remaining for said consumer to view said service during said fixed period.

18. Apparatus in accordance with claim 15 further comprising:

means for maintaining a record in a cryptographically secure manner to indicate the amount of unused preview time remaining for said consumer to view said service during said fixed period.

19. Apparatus in accordance with claim 15 further comprising:

means for maintaining up to N records of active previewable services at a time, each record comprising either a purchase record representing a previewable service that has been purchased by said consumer or a preview record representing a service that said consumer has selected for preview; and means for preventing the expiration of an active previewable service record until the program epoch for the service represented by that record is over.

20. Apparatus in accordance with claim 19 further comprising:

means for preventing the erasure of any preview record until the program epoch for the service represented thereby is over.

21. Apparatus in accordance with claim 19 further comprising:

means for converting a preview record to a purchase record upon purchase by the consumer of the service represented by the preview record; and means for rendering the purchase record provided by said converting means irrevocable.

22. Apparatus in accordance with claim 21 further comprising:

means for preventing the erasure of any preview record until the program epoch for the service represented thereby is over, except by conversion to an irrevocable purchase record.

23. Apparatus in accordance with claim 19 further comprising:

means for denying any additional previews or previewable services to said consumer whenever all N previewable service records are active.

24. Apparatus in accordance with claim 15 wherein said user interface comprises:

means for informing said consumer of how much unused preview time remains for said service.

25. Apparatus in accordance with claim 15 wherein said epoch is divided into a plurality of working key epochs, a cryptographically authenticated count of which is used to implement said maximum preview duration.

26. Apparatus in accordance with claim 25 further comprising:

means for cryptographically authenticating at least the portion of said data that identifies whether a preview is available for said service.

27. Apparatus in accordance with claim 26 wherein said fixed period is enforced in a cryptographically secure manner.

28. Apparatus in accordance with claim 15 further comprising:

means for cryptographically authenticating at least the portion of said data that identifies whether a preview is available for said service.

29. Apparatus in accordance with claim 15 wherein said fixed period is enforced in a cryptographically secure manner.

* * * * *